United States Patent [19]
Copeland et al.

[11] Patent Number: 5,878,260
[45] Date of Patent: *Mar. 2, 1999

[54] INFORMATION HANDLING SYSTEM, METHOD, AND ARTICLE OF MANUFACTURE INCLUDING OBJECT NAME SERVICES WITH MULTILEVEL INDICES

[75] Inventors: George Prentice Copeland; Vinoj Narayan Kumar, both of Austin, Tex.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 554,063

[22] Filed: Nov. 6, 1995

[51] Int. Cl.⁶ .............................. G06F 9/44; G06F 17/30
[52] U.S. Cl. .......................... 395/702; 707/103; 395/683
[58] Field of Search ................................. 395/702, 614, 395/670, 683; 707/103

[56] References Cited

U.S. PATENT DOCUMENTS

| | | | |
|---|---|---|---|
| 5,377,323 | 12/1994 | Vasudevan | 395/200 |
| 5,577,252 | 11/1996 | Nelson et al. | 395/670 |
| 5,581,761 | 12/1996 | Radia et al. | 395/702 |
| 5,619,710 | 4/1997 | Travis, Jr. et al. | 395/800 |

*Primary Examiner*—Tariq R. Hafiz
*Assistant Examiner*—Kakali Chaki
*Attorney, Agent, or Firm*—Mark S. Walker; George E. Clark

[57] ABSTRACT

A prior art naming module supports binding of an object to a name in a Naming Context (i.e., a directory). The present invention extends this original module to support properties (data about bindings), searching (finding bindings given constraints on properties) and indexing (for speeding up the search on certain property names). The ExtendedNamingContext (ENC) is a subclass of the OMG NamingContext (NC) that introduces properties, searching and indexing.

17 Claims, 3 Drawing Sheets

AN OBJECT BOUND IN TWO ENCs
WITH SHARED PROPERTIES

INFORMATION HANDLING SYSTEM, METHOD, AND ARTICLE OF MANUFACTURE INCLUDING OBJECT NAME SERVICES WITH MULTILEVEL INDICES

TECHNICAL FIELD OF THE INVENTION

The present invention relates to information handling systems, methods and articles of manufacture, and more particularly to information handling systems and methods for implementing object name services in an object oriented system.

BACKGROUND OF THE INVENTION

A related copending application (Ser. No. 08/537,648 AT995-092) teaches and claims an information handling system, method and article of manufacture for automatically inserting object services such as persistence, concurrency, recoverability, security and distribution into binary classes in an information handling system employing object oriented technology. The related invention includes registering a description of a class in a name service context, and searching the name service context for a class object referred to as a factory, among other elements of the invention.

To accomplish the goals of the related invention, an object name service is needed. The name service should have the following characteristics:

1. Support binding objects to names;
2. Support associating properties with an object binding;
3. Support properties per binding or properties across bindings for an object;
4. Support searching for objects based on object properties;
5. Support multilevel searches; and
6. Support indexing to permit scaling to large numbers of objects and properties.

PRIOR ART

In the prior art there are many techniques for improving object oriented programming systems (OOPS).

The following are examples of the prior art.

U.S. Pat. No. 5,093,914 generally teaches a method used by a digital computer in controlling execution of an object oriented program to effect a defined action, for example, stopping the program when a specified virtual function is invoked on a specified object during execution of the program.

Although the patent generally deals with methods for controlling execution of object oriented programs, the patent does not teach nor suggest automatically inserting object services into binary classes in an object oriented system as is taught and claimed herein with reference with the present invention.

U.S. Pat. No. 5,343,554 teaches a computing system in which problems are solved by a process which includes creating objects of first and second classes wherein the second class objects are externally invocable and where the externally invocable sub-class objects include an indication of an internally invocable sub-class object and executing the class of objects wherein one externally invocable sub-object invokes the internally invocable sub-object and a new object of the first class is generated in response to the results.

Although the patent deals generally with the use of object oriented systems including classes and sub-classes for solving problems, the patent does not teach nor suggest automatically inserting object services into binary classes in an object oriented system as is taught and claimed herein with reference with the present invention.

There is a need to automatically add object services features, for example, persistence, recoverability, concurrency and security to a binary class. Sometimes the source code of a class is not available for modification. Even when the source code is available, a considerable reprogramming effort is required to add the object services features.

A user should be able to add object services features in a way that does not increase the size of the users class diagram with many variations on the original class. The user should be able to specify these object services features as constraints along with constraints that describe the function of the class when searching for the class.

An overall goal in object oriented programming systems is the development of program objects which can be reused easily.

The importance of binary code over source code increases with the degree of reuse. A main purpose of object oriented technology is code reuse. For object oriented technology to achieve large scale success, binary code reuse is essential. As the state of the art moves towards applications built from object formats which can be tailored and plugged into each other, binary code is critical.

The Object Management Group (OMG) is currently defining a set of interfaces for object system services named Common Object Services.

SUMMARY OF THE INVENTION

It is an object of the present invention to provide a name service which supports searching and indexing in an object oriented information handling system.

Accordingly, a system and method in an information handling system employing object oriented technology, includes means for extending a naming context module to support properties (data about bindings), searching (finding bindings given constraints on properties) and indexing (for speeding up the search on certain property names). The ExtendedNamingContext (ENC) is a subclass of a NamingContext (NC) that introduces properties, searching and indexing.

It is an advantage of the present invention that object properties, searching and indexing can be efficiently incorporated in a naming context module in an information handling system.

DETAILED DESCRIPTION OF A PREFERRED EMBODIMENT OF THE INVENTION

Figure 1:
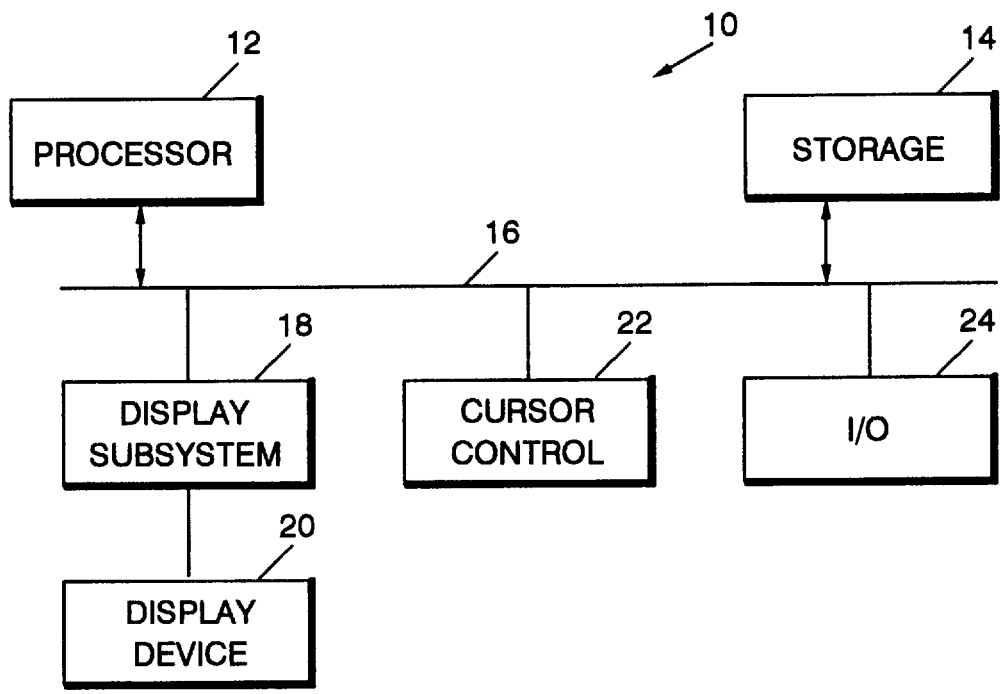
FIG. 1 is a block diagram of a system for executing the method according to the present invention.
Figure 2:
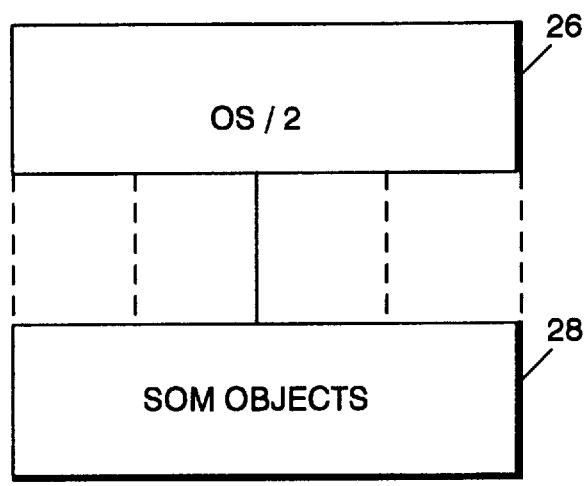
FIG. 2 is a block diagram showing the operating system platform and system object model program supporting the present invention.

Referring now to FIGS. 1 and 2, on information handling system 10 and an operating system environment for the present invention will be described.

Information handling system 10 may be a graphics work station or the like with a very powerful processor 12, a storage system 14, a system bus 16, display sub-system 18 controlling a display device 20, a cursor control device 22, and an I/O controller 24, all connected by system bus 16. The information handling system 10, shown in FIG. 1 may be operated by a commercially available well known multitasking operating system such as OS/2* (OS/2 is a registered trademark of International Business Machines Corporation). Among many tasks which the OS/2 operating system controls an operating information handling system 10, is execution of a program SoMobjects, which is a commercially available product of International Business Machines Corporation.

The method and article of manufacture of the present invention may be incorporated in the SOMObjects program.

The original OMG Naming module supports binding of an object to a name in a Naming Context (i.e., a directory). The present invention extends this original module to support properties (data about bindings), searching (finding bindings given constraints on properties) and indexing (for speeding up the search on certain property names). The ExtendedNamingContext (ENC) is a subclass of the OMG NamingContext (NC) that introduces properties, searching and indexing. An example of the extension is listed below:

```
module Naming {
/* extensions to the original Naming module */
    typedef sequence<Istring> IList;
    typedef IIterator {
        boolean nextIstring(out Istring i);
        boolean nextNIstringss(
            in unsigned long howMany,
            out IList il) ;
    }
    typedef Lifecycle::NVP Property;
    /*  NVP (name-value pair) uses Istring for a name and any for
        a value. */
    typedef sequence<Property> PropertyList;
    interface PropertyIterator {
        boolean nextProperty(out Property p);
        boolean nextNProperties(
            in unsigned long howMany,
            out PropertyList props);
    }
    typedef string Constraint;
    /*  Sun constraint language in LifeCycle Appendix B, which
        supports integers, floats and strings in the query
        predicate. */
    typedef IndexDescriptor {
        Istring property_name;
        unsigned long distance
    }
    typedef
        sequence<IndexDescriptor>IndexDescriptorList;
    typedef IndexIterator {
        boolean nextIndex(out IndexDecriptor i);
        boolean nextNIndex(
            in unsigned long howMany,
            out IndexDescriptorList il); }
    interface ExtendedNamingcontext : NamingContext {
    /*  First, support of properties. */
        attribute sequence<string>allowed_object_types;
            /*  A list of the types of objects that can be bound
                into this ENC. Empty implies no restrictions. */
            attribute sequence<string>
                allowed_property_types;
        /*  A list of the types of properties that can be added
            to the entries in this ENC. Empty implies no
            restrictions. */
        attribute sequence<string>
            allowed_property_names;
        /*  A list of the names of properties that can be added
            to the entries in this ENC. Empty implies no
            restrictions. */
    int getFeaturesSupported ( )
        raises( );
    /*  This gets a bit vector that describes what features
        this ENC implementation supports. The bit map is
            0       properties
            1       searching
            2       indexing
            3       restrictions on object types
            4       restrictions on property types
            5       restrictions on property names
            6–31    not used
    void addProperty(
        in NameComponent nc,
        in Property p)
    raises( InvalidName,
            InvalidPropertyName,
            NotSupported);
    /*  Associate a property p with name nc in target
        context. Name nc need not have been previously
        bound, nor need it already have properties
        previously associated with it. If nc has no
        binding, then it is bound to a null object.
        Replaces old value if property name already exists.
        /*
    void addProperties(
        in NameComponent nc,
        in PropertyList props)
        raises( InvalidName,
            InvalidPropertyName,
            NotSupported);
    /*  Associate props with name nc in target context.
        Name nc need not have been previously bound, nor
        need it already have properties previously
        associated with it. If nc has no binding, then it
        is bound to a null object. Replaces old value if
        property name already exists. */
    void bindWithProperties(
        in NameComponent nc,
        in Object obj,
        in PropertyList props)
        raises( InvalidName,
            AlreadyBound,
            InvalidPropertyName,
            Notsupported);
    /*  Combination of a simplified bind (binding of a
        NameComponent, not a full Name) and addProperties.
        Fails if nc already bound in target. */
    void bindContextWithProperties(
        in NameComponent nc,
        in NamingContext obj,
        in PropertyList props)
        raises( InvalidName,
            AlreadyBound,
            InvalidPropertyName,
            Notsupported);
    /*  Combination of a simplified bind_context (binding
        of a NameComponent, not a full Name) and
        addProperties. Fails if nc already bound in
        target. */
    void rebindWithProperties(
        in NameComponent nc,
        in Object obj,
        in PropertyList props)
        raises( InvalidName,
            InvalidPropertyName,
            Notsupported);
    /*  Combination of a simplified rebind (rebinding of a
        NameComponent, not a full Name) and addProperties.
        */
    void rebindContextWithProperties(
        in NameComponent nc,
        in NamingContext obj,
        in PropertyList props)
        raises( InvalidName,
            InvalidPropertyName,
            NotSupported);
    /*  Combination of a simplified rebind_context
        (rebinding of a NameComponent, not a full Name) and
        add Properties. */
```

```
void bindWithSharedProperties(
    in NameComponent target_nc,
    in ExtendedNamingContext source_enc,
    in NameComponent source_nc)
    raises( NotFound,
        InvalidName,
        AlreadyBound,
        NotSupported);
/* Creates a binding within the target ENC of the name
   target_nc with the same object and properties that
   are already bound at source_nc in the source_enc.
   Fails if target_nc already bound in target. All
   shared bindings have equal status. A shared
   binding is removed via unbind. */
void rebindWithShared Properties(
    in NameComponent target_nc
    in ExtendedNamingContext source_enc,
    in NameComponent source_nc)
    raises( NotFound,
        InvalidName,
        NotSupported);
/* Creates a binding within the target ENC of the name
   target_nc with the same object and properties that
   are already bound at source_nc in the source_enc,
   even if target_nc is already bound in target. All
   shared bindings have equal status. A shared
   binding is removed via unbind. */
void bindContextWithSharedProperties(
    in NameComponent target_nc,
    in ExtendedNamingContext source_enc,
    in Namecomponent source_nc)
    raises( NotFound,
        InvalidName,
        AlreadyBound,
        NotSupported);
/* Creates a binding within the target ENC of the name
   target_nc with the same object and properties that
   are already bound at source_nc in the source_enc.
   Fails if target_nc already bound in target. All
   shared bindings have equal status. A shared
   binding is removed via unbind. */
void rebindContextWithSharedProperties(
    in NameComponent target_nc
    in ExtendedNamingContext source_enc,
    in NameComponent source_nc)
    raises( NotFound,
        InvalidName,
        NotSupported);
/* Creates a binding within the target ENC of the name
   target_nc with the same object and properties that
   are already bound at source_nc in the source_enc,.
   even if target_nc is already bound in target. All
   shared bindings have equal status. A shared
   binding is removed via unbind. */
void listProperties(
    in NameComponent nc,
    in unsigned long howMany,
    out IList inames,
    out IIterator rest)
    raises( NotFound,
        InvalidName,
        NotSupported);
/* Resolves nc in target and returns at most howMany
   of the object's property names in inames. If more
   exist, an iterator is returned that holds the
   remaining names. */
void getProperty(
    in NameComponent nc,
    in Istring pn,
    out any value)
    raises( NotFound,
        InvalidName,
        InvalidPropertyName,
        Notsupported);
/* Resolves nc in target and returns value of property
   with name pn. */
void getSomeProperties(
    in NameComponent nc,
    in unsigned long howMany,
    in Ilist inames,
    out PropertyList props,
    out PropertyIterator rest)
    raises( NotFound,
        InvalidName,
        InvalidPropertyName,
        NotSupported);
/* Resolves nc in target and returns at most howMany
   of the object's properties in props whose name is
   in inames. If more exist, an iterator is returned
   that holds the remaining properties. */
void getAllProperties(
    in NameComponent nc,
    in unsigned long howMany,
    out PropertyList props,
    out PropertyIterator rest)
    raises( NotFound,
        InvalidName,
        NotSupported);
/* Resolves nc in target and returns at most howMany
   of the object's properties in props. If more
   exist, an iterator is returned that holds the
   remaining properties. */
Object getObjectAndProperty(
    in NameComponent nc,
    in Istring n,
    out any v)
    raises( NotFound,
        InvalidName,
        InvalidPropertyName,
        NotSupported);
/* Combination of simple resolve (resolve of a
   NameComponent, not a Full Name) and getProperty. */
Object getObjectAndSomeProperties(
    in NameComponent nc,
    in unsigned long howMany,
    in Ilist inames,
    out PropertyList props,
    out PropertyIterator rest)
    raises( NotFound,
        InvalidName,
        InvalidPropertyName,
        NotSupported);
/* Combination of simple resolve (resolve of a
   NameComponent, not a full Name) and
   getAllProperties. */
Object getObjectAndAllProperties(
    in NameComponent nc,
    in unsigned long howMany,
    out PropertyList props,
    out PropertyIterator rest)
    raises( NotFound,
        InvalidName,
        NotSupported);
/* Combination of simple resolve (resolve of a
   NameComponent, not a full Name) and
   getAllProperties. */
void removeProperty(
    in NameComponent nc,
    in Istring n)
    raises( NotFound,
        InvalidName,
        InvalidPropertyname,
        NotSupported);
/* Resolves nc in target and removes property with
   name n. */
void removeSomeProperties(
    in NameComponent nc,
    in sequence<Istring> nlist)
    raises( NotFound,
        InvalidName,
        InvalidPropertyName,
        NotSupported);
/* Resolves nc in target and removes properties with
   name in list nlist. */
void removeAllProperties(
    in NameComponent nc)
    raises( NotFound,
        InvalidName,
        NotSupported);
/* Resolves nc in target and removes all properties.
```

-continued

```
     */
  /* Note that the implementation of unbind for a ENC
     also removes all properties. */
/* Second, support for queries. */
     Object findAny(
         in Constraint c,
         in unsigned long distance)
         raises (NotSupported);
     /* findAny returns the first object satisfying the
        constraint in the target ENC and in ENCs not more
        than distance of the target ENC (distance==0
        implies the target ENC only). If none is found,
        then the NULL object is returned. The search
        algorithm (e.g., depth-first) is unspecified. */
     void FindAll(
         in Constraint c,
         in unsigned long distance,
         in unsigned long howMany,
         out SearchableNamingContext snc,
         out BindingList bl,
         out BindingIterator bi)
         raises (NotSupported);
     /* findAll returns all bindings in bl for objects
        satisfying the constraint in the target ENC and in
        ENCs not more than distance of the target ENC
        (distance==0 implies the target ENC only). The
        search algorithm (e.g., depth-first) is
        unspecified. The returned list bl includes at most
        howMany elements. If there are more, they are
        contained in the iterator bi. Also returned is a
        ENC containing at least the qualifying objects
        which can be used for further searching (via
        findAny, findAll, or manual iteration and
        examination of properties or objects) and resolving
        to the chosen object/s. */
  /* Third, support for indexing. */
     void AddIndex(
         in IndexDescriptor i)
     raises( );
     /* Adds an index to the target for fast searching on
        the property_name for a distance from the target.
        */
     void listIndexes(
         in unsigned long howMany,
         out IndexDescriptorList il,
         out IndexIterator rest)
         raises( );
     /* Returns at most howMany of the index descriptors
        for indexes in the target. If more exist, an
        iterator is returned that holds the remaining
        indexes. */
     void removeIndex(
         in IndexDescriptor i)
         raises (NotFound);
     /* Removes an index from the target. */
```

Figures 3, 4:
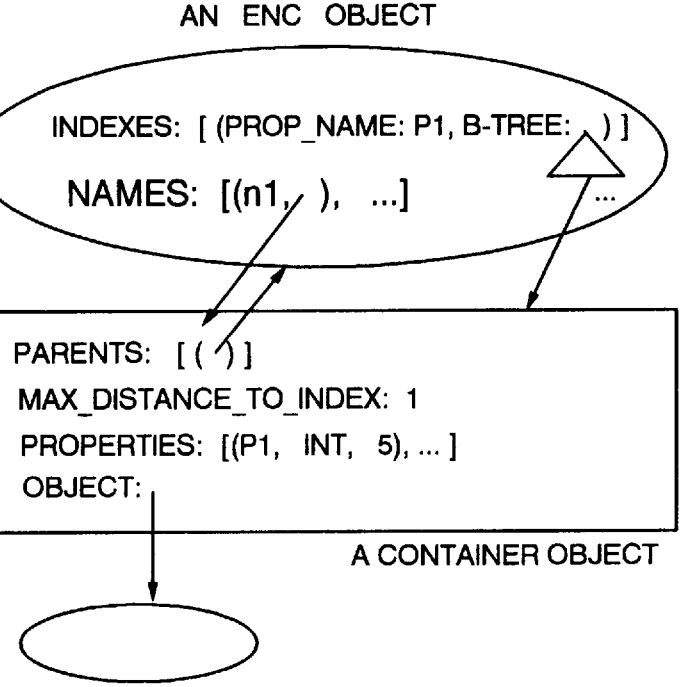
FIG. 3 is a diagram of extended naming context objects with properties bound to other objects in accordance with the present invention.
FIG. 4 is a diagram of extended naming context objects with an index bound to other objects in accordance with the present invention.

Referring now to FIG. 3, the operations that do a binding (bind, rebind, bind_context, bind_new_contest, rebind_context, bindWithProperties, bindContextWithProperties, rebindWithProperties, rebindContextWithProperties) will be described.

1. Create a container object in the same server (process) as the target ENC. The container object has the following state:
   a) sequence<ENC>parents; /* init to empty */
   b) unsigned long max_distance_to_index; /* init to 0 *,
   c) sequence<Property>properties; /* init to empty */
   d) Object object; /* init to null object */
2. Within the ENC, associate the container with the name to be bound;
3. Add the target ENC to the container's parents;
4. container→object=the object to be bound;

Referring now to FIG. 4, the operation to add an index (addIndex) will be described:

1. For each name in the target ENC, ask its container to
   1.1 update its max_distance_to_index;
   1.2 relay the request to get index information (typed values of properties with the index's property name and the ENC that contains it) to the container. (This private operation includes the property name, the distance parameter and how far it is from the index. The recursion stops when the distance parameter and how far it is from the indexes are equal. The index information is accumulated upon returning at each level of the recursion.)
2. Using the recursively accumulated index information, build an index in the target ENC.

The max_distance_to_index allows the container object and ENC to know how far relay changes to properties that might affect an index, and the parents list allows them to know to whom to send this information.

Figure 5:
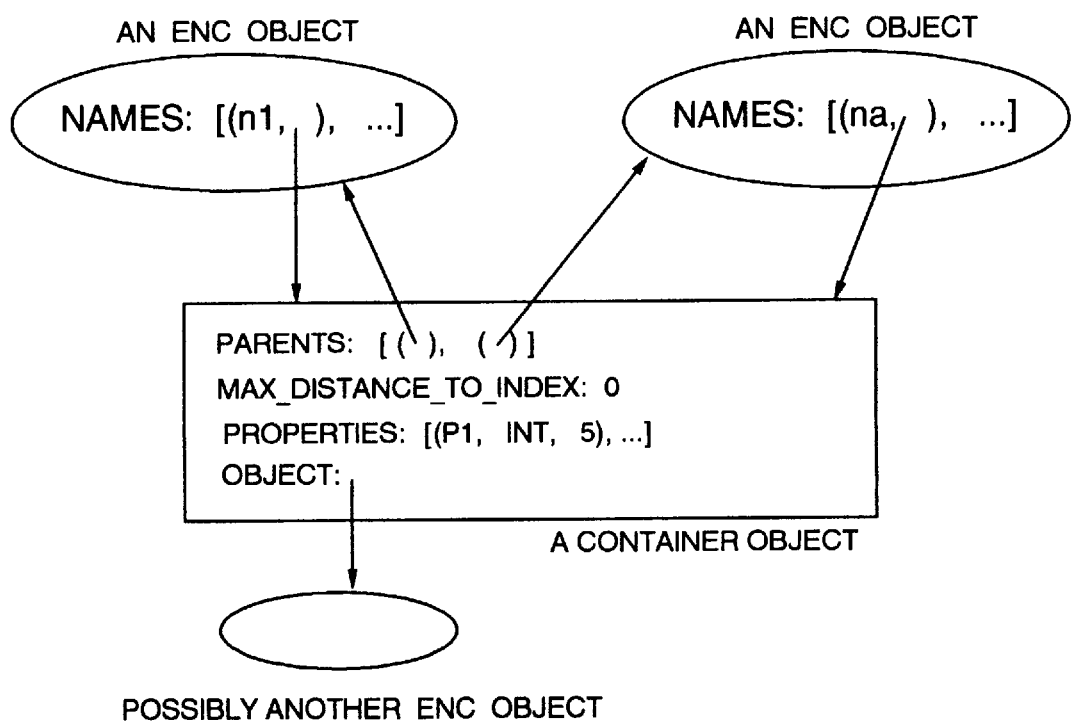
FIG. 5 is a diagram of an object bound in more than one extended naming context objects with shared properties in accordance with the present invention.

The operations that add properties or change their values (addproperty, addproperties, bindWithProperties, bindContextWithProperties, rebindWithPropertis, rebindContextWithProperties, removeProperty, removeSomeProperties, removeAllProperties) includes the following implementation:

1. Resolve the name within the target ENC to the container;
2. Add the input properties to the container's properties;
3. For each parent in the container's parents, tell the parent to update its index (this private operation includes the changed properties and the max_distance_to_index, which is decremented for each relay until zero when the relays can stop);

The operations that get the names of properties or the properties (listProperties, getproperties, getSomeProperties, getAllProperties, getObjectAndProperties, getobjectAndSomeProperties, getobjectAndAllProperties) include the following implementation:

1. Resolve the name within the target ENC to the container;
2. Return container→properties and/or container→object;

The resolve operator includes the following implementation:

1. Resolve the name within the target ENC to the container;
2. Return container→object;

Referring now to FIG. 5, the operations that create a shared object and its properties (bindWithSharedProperties, rebindWithSharedProperties) will be described:

1. shared_container=resolve the source name within the source ENC to the container;
2. Within the target ENC, associate the shared_container with the target name;
3. Add the target ENC to the shared_container's parents;
4. Any indexes in the target ENC or above must be updated (to do this, use a combination of the above algorithms to get the index information below and update the indexes above);

The unbind operator includes the following implementation:

1. Resolve the name within the target ENC to the container;
2. Remove the target ENC from the container's parents;
3. If the container's parents is empty, deallocate the container.

It will be appreciated that although a specific embodiment of the present invention has been described herein for the purposes of illustration, various modifications may be made without departing from the spirit or scope of the invention.

Accordingly, the scope of this invention is limited only by the following claims and their equivalents.

What is claimed is:

1. An information handling system, comprising:

one or more processors;

a storage system;

one or more I/O controllers;

a system bus connecting the processors, the storage system and the I/O controllers;

an operating system program for controlling operation of the information handling system; and an object based program operating in association with the operating system program for controlling execution of program modules represented by one or more objects, the object based program having;

means for creating an extended naming context object and container object hierarchically related to said extended naming context object, said container object including a plurality of properties, each of said properties including an identifier and a value; and means for searching said container object in response to a request received in said extended naming context for objects that satisfy a specified condition expressed in terms of properties;

means for returning to a search requester all objects satisfying the specified condition.

2. A system according to claim 1, wherein the object based program further comprises:

means for associating a container object with a name to be bound.

3. A system according to claim 1, wherein the object based program further comprises:

means for adding an index to an extended naming context object said index containing values for said for properties in said container objects.

4. A system according to claim 3, wherein the means for adding an index further comprises:

means for controlling a maximum number of levels between a request and an index.

5. A system according to claim 1, wherein the object based program further comprises:

means for creating one or more extended naming context objects having shared properties.

6. A system according to claim 5, wherein the means for creating one or more objects having shared properties further comprises:

means for resolving a first object name in a first extended naming context object to a container object;

means for associating the container object with a second object name;

means for adding a second object to a parent list in the container object;

means for locating each index that would identify the second object; and means for updating each located index in any associated extended naming context object.

7. A computer readable medium, having program logic recorded the computer readable medium managing an extended naming context, comprising:

program logic means for creating a plurality of extended naming context objects each having a first name, program logic means for creating one or more container objects having a state including a plurality of properties, each property having an identifier and a value, each container object being associated with one or more of said extended naming context objects;

program logic means for receiving a search request in an extended naming context object, said search request specifying constraints in terms of property identifiers and values;

program logic means for searching said container objects by matching said constraints to said properties;

program logic means for returning objects meeting said constraints in response to said search request.

8. A computer readable medium, according to claim 7, further comprising:

program logic means for setting one or more predetermined properties associated with one or more extended naming context objects.

9. A computer readable medium, according to claim 7, further comprising:

program logic means for associating a container object with a name to be bound.

10. A computer readable medium according to claim 7, further comprising:

program logic means for adding an index to an extended naming context object, said index being based on said properties.

11. A computer readable medium according to claim 7, further comprising:

program logic means for creating one or more objects having shared properties.

12. A computer readable medium, according to claim 7, wherein the program logic means for creating one or more objects having shared properties further comprises:

program logic means for resolving a first object name in a first extended naming context object to a container object;

program logic means for associating the container object with a second object name;

program logic means for adding a second object to a parent list in the container object;

program logic means for locating each index that would identify the second object; and program logic means for updating each located index in any associated extended naming context object.

13. A method for improving performance of an object name resolution service, comprising the steps of:

creating one or more container objects having a plurality of properties, said properties having an identifier and a value, each container object being associated with one or more extended naming context objects;

setting one or more predetermined properties associated with one or more extended naming context objects;

receiving a request in an extended naming context object to search for an object meeting a constraint expressed in terms of properties;

searching said container objects for ones satisfying said constraints;

returning a response to said request to search all objects satisfying said constraints.

14. The method according to claim 13, further comprising the step of:

associating a container object with a name to be bound.

15. The method according to claim 13, further comprising the step of:

adding an index to each of said extended naming context objects, the index identifying properties in said container objects.

16. The method for improving performance of an information handling system, according to claim 13, further comprising the step of:

creating one or more objects having properties shared with another object.

17. The method according to claim 13, wherein the creating one or more objects having properties shared with another object step further comprises the steps of:

resolving a first object name in a first extended naming context object to a container object;

associating the container object with a second object name;

adding a second object to a parent list in the container object;

locating each index that would identify the second object; and updating each located index in any associated extended naming context object.

\* \* \* \* \*